Figure 1:
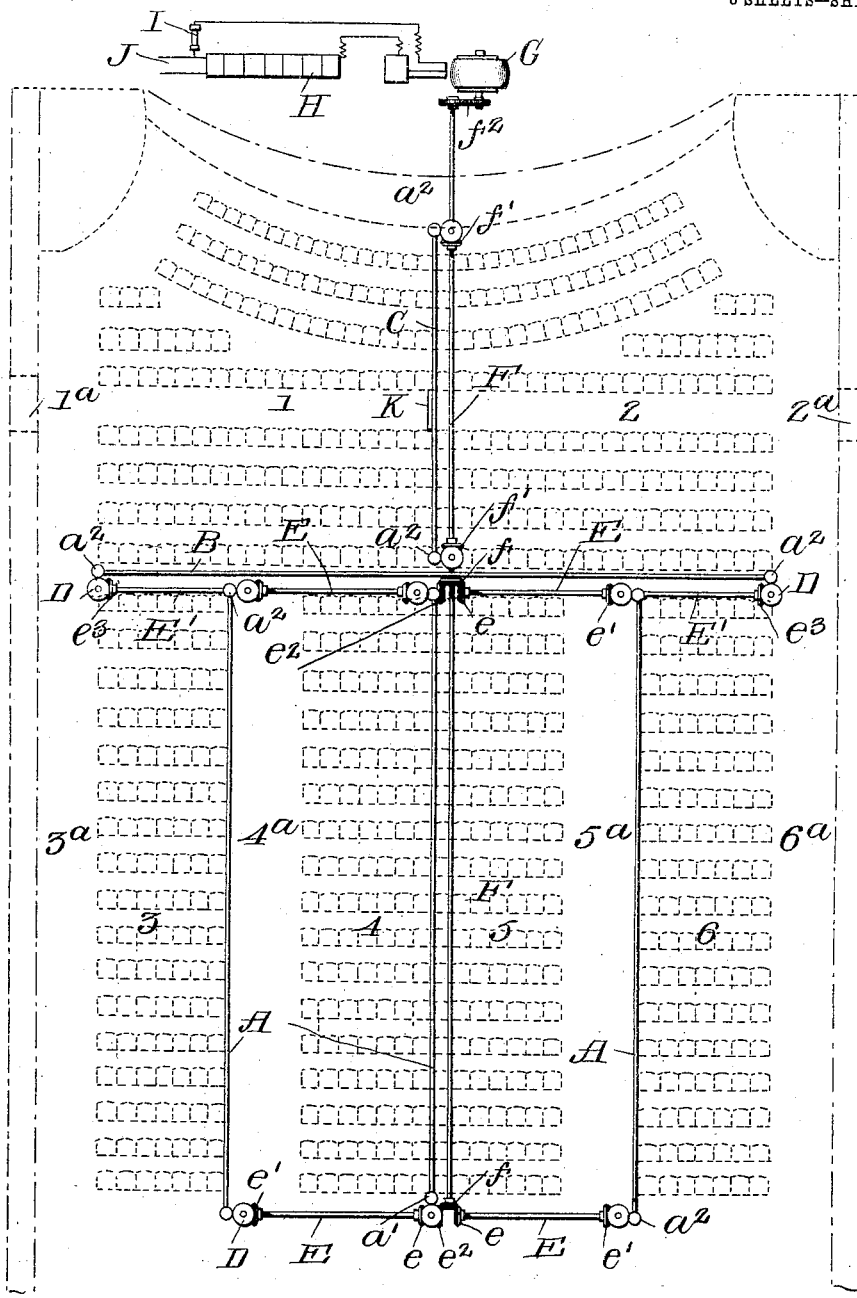

No. 779,306. PATENTED JAN. 3, 1905.
J. P. PAGE.
PANIC GUARD FOR THEATERS, &c.
APPLICATION FILED MAY 23, 1904.

3 SHEETS—SHEET 1.

No. 779,306. PATENTED JAN. 3, 1905.
J. P. PAGE.
PANIC GUARD FOR THEATERS, &c.
APPLICATION FILED MAY 23, 1904.
3 SHEETS—SHEET 2.
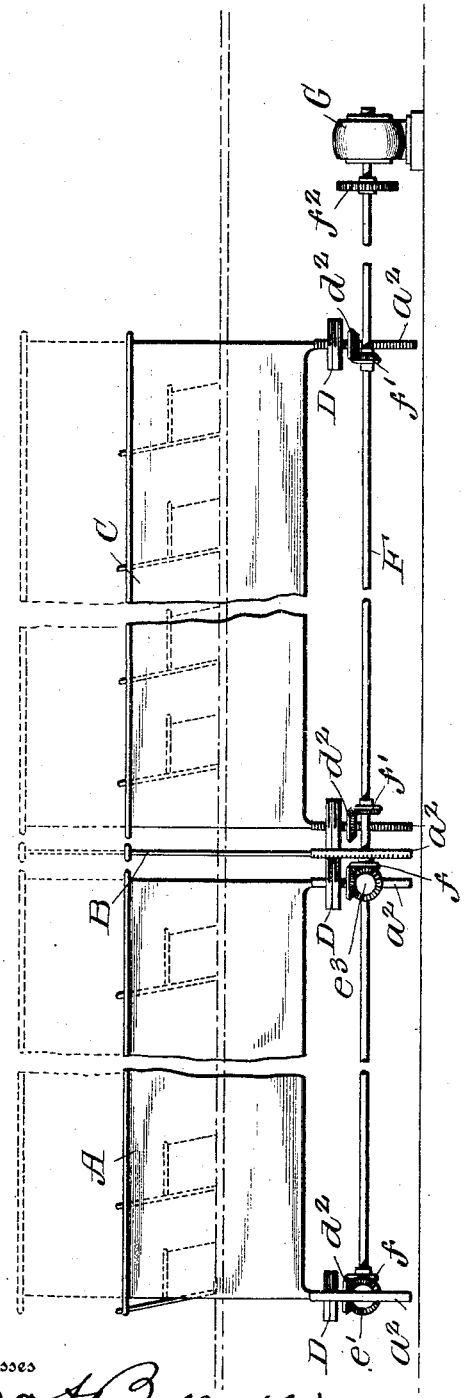
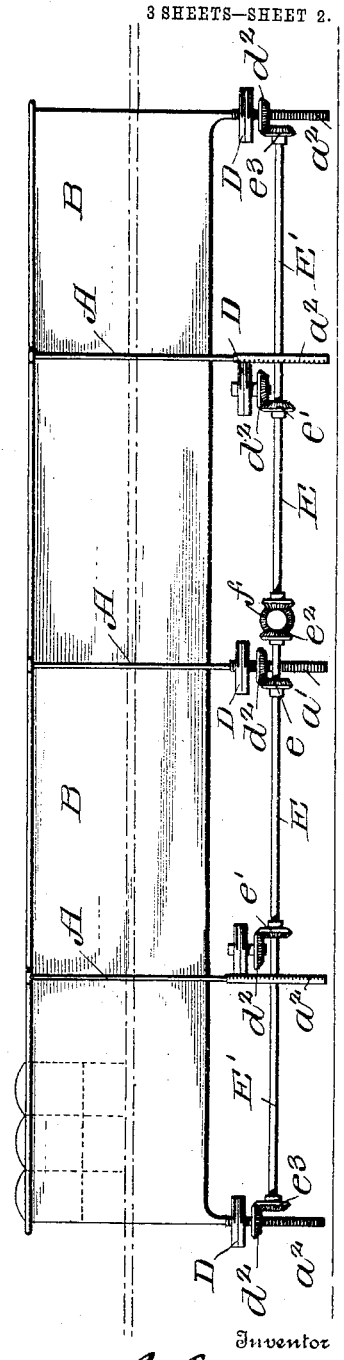

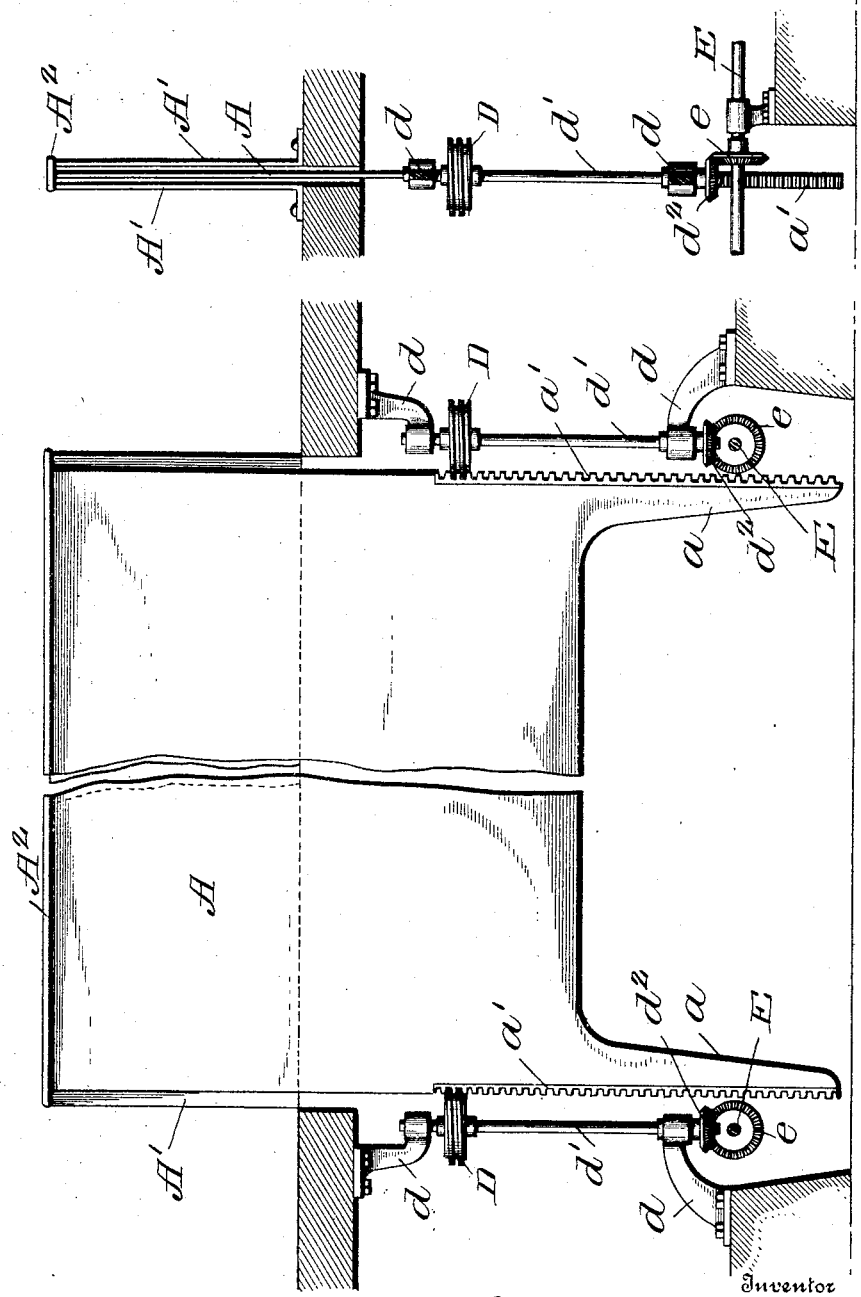

No. 779,306. Patented January 3, 1905.

UNITED STATES PATENT OFFICE.

JOSEPH P. PAGE, OF PORTLAND, OREGON, ASSIGNOR OF ONE-HALF TO EUGENE BLAZIER, OF PORTLAND, OREGON.

PANIC-GUARD FOR THEATERS, &c.

SPECIFICATION forming part of Letters Patent No. 779,306, dated January 3, 1905.

Application filed May 23, 1904. Serial No. 209,394.

*To all whom it may concern:*

Be it known that I, JOSEPH P. PAGE, a citizen of the United States, residing at Portland, in the county of Multnomah and State of Oregon, have invented certain new and useful Improvements in Panic-Guards for Theaters, &c.; and I do hereby declare the following to be a full, clear, and exact description of the invention, such as will enable others skilled in the art to which it appertains to make and use the same.

My invention relates to improvements in panic-guards for theaters, halls, and other public structures, and is especially applicable for use in such buildings in emergency cases, such as fires, but may be equally as well adapted for controlling the exit of the audiences after performances to prevent crowding.

The object of the invention is to provide means adapted when operated to systematically divide the floor-space of the structure into two or more sections, whereby the exit of the audience may be controlled, so that only the aisle to each section can be used by that portion of the audience seated in that particular section and the liability of jam in any one aisle, stairway, or exit is reduced to a minimum.

Broadly speaking, the invention consists in a movable partition or a plurality of movable partitions so disposed relatively to the floor that they may be elevated a considerable distance above the audience when desired by any suitable operating mechanism.

To more fully describe the invention, reference is had to the accompanying drawings, illustrating the application of the same, in which for the purposes of illustration is shown an arrangement of gearing connected to the movable partition operated by an electric motor; but I do not wish to limit myself to the specific details as disclosed therein.

Referring to the drawings, Figure 1 represents a diagrammatic plan view of the arrangement of movable partitions and a suitable system for operating the same as applied to the ground-floor of a theater, the floor being omitted to show the operating mechanism, preferably located below the same. Fig. 2 is a view in side elevation of the same, sections of the partitions being broken away and the same being shown in dotted lines in their elevated position. Fig. 3 is a view in elevation looking from the rear. Fig. 4 is an enlarged detail view, in side elevation, of one section of the movable partitions with its operating mechanism, one side wall of the stationary partition being omitted; and Fig. 5 is an edge view of the same, both side walls of the stationary partition being shown, the supporting brackets for the vertical shaft being in section.

In carrying out the system I preferably arrange a plurality of movable partitions A, disposed longitudinally of the rear portion of the hall and adjacent the rows of seats, on one side of the aisles, with a similar partition extending centrally of the main central section, located between the two aisles.

The forward end of the hall may be substantially separated from the rear seats by a transverse movable partition B, and the floor-space of the forward portion of the hall might be further divided off into sections by the central longitudinally-extending movable partition C. By this arrangement it will be observed that the occupants of the section indicated at 1 will have immediate exit through the door $1^a$, the occupants of section 2 through the door $2^a$, and the occupants of sections 3, 4, 5, and 6 through the aisles $3^a$, $4^a$, $5^a$, and $6^a$, respectively. Of course it will be understood that this particular arrangement might have to be changed materially to accommodate the system to the particular seating construction of the hall, as well as the balconies thereof, the drawings simply illustrating the general application of the system to the ground-floor of a hall having the ordinary arrangement of seats and aisles.

The partitions A, B, and C are preferably the same in construction and may be of any suitable structure and composed of any suitable material. In actual practice I would prefer to form them of a continuous sheet of metal; but they may obviously be of sectional form.

With particular reference to the form of the partitions illustrated in the drawings, A' A' designate the spaced walls of the hollow stationary partitions adapted to receive the movable partitions.

The stationary partitions are preferably fixed to the floor and may extend above the floor to a height slightly less than the backs of the seats or chairs, so as not to interfere with or obstruct the view of the audience, also taking up little, if any, of the seating room, without changing materially the appearance of the house, but substantially dividing the same off into a plurality of sections.

Within the spaced walls of the stationary partitions are disposed the movable partitions, the operation and construction of which will now be described with particular reference to Figs. 4 and 5, which for the purpose of simplicity of description I will refer to as the "central" partition A. It will be seen that this partition preferably consists of a continuous metallic sheet provided at its lower end with the downwardly-extending portions $a$, and the end edges of this sheet are provided with racks $a'$, extending a suitable distance on the end edges of the enlarged portion thereof and downwardly along the end edges of the depending projections $a$. Although in Figs. 4 and 5 I have illustrated the racks as being on the end edges of the partition, it is obvious that these racks may be placed on the side faces of the partitions, disposed in a transverse plane instead of in the same longitudinal plane, and in Figs. 1, 2, and 3 I have indicated this transverse disposition of the face of the racks by the letter $a^2$.

The depth of the movable partitions is preferably about twice the depth of the stationary partitions, and the lower half thereof extends below the floor, the upper edge being provided with a flanged rail $A^2$, which is adapted to rest on top of the side walls of the spaced stationary partition for neatness of appearance. Below the floor are arranged suitable brackets $d$, provided with suitable bearings, in which are journaled the vertical shafts $d'$, carrying the worm-wheel D thereon and at one end a bevel-gear $d^2$, adapted to mesh with the bevel-gear $e$ on the shaft E, the other end of which is provided with a similar bevel-gear $e'$, adapted to mesh with a bevel-gear corresponding to $d^2$ on the vertical shaft corresponding to the shaft $d'$, operating one of the movable partitions of the system.

Referring to Fig. 1, the shafts E are shown as provided with a second bevel-gear $e^2$, which, together with the bevel-gears $e$ on the opposite shaft E, are adapted to mesh with the bevel-gears $f$ on the shaft F, extending centrally of the whole length of the hall. This central shaft F is also provided with the bevel-gears $f'$, adapted to operate the vertical shafts $d'$ in the forward portion of the hall for elevating the movable partition C.

E' designates branch arms on the shafts E, centrally of the hall, carrying the bevel-gear $e^3$ and coöperating with suitable gearing, as heretofore described, for elevating the transverse partition B, the end racks of which, $a^2$, are disposed on the side face of the movable partition instead of on the end edges, as heretofore mentioned.

G designates an electric motor connected by the gearing $f^2$ to the shaft F, and this motor is run by any suitable source of electric generation, illustrated in the drawings as a storage battery H, I designating a switch, and J representing wires running to the operating-station, which may be one central station or may be several stations at different parts of the building.

If desirable, the partitions may be provided with suitably-constructed emergency-doors, and for the purpose of illustration I have indicated one of these doors at K in the forward partition C.

It will be understood that although I have described the mechanism for operating the movable partitions as comprising racks and gearing connected therewith driven by an electric motor, as heretofore mentioned, I do not limit myself to any particular means for elevating the partition, as this may be done by any suitable operating mechanism driven by any source of power, such as hydraulic or other fluid, compressed air, gas, or steam. It will also be obvious that many modifications in the general arrangement and construction of details might be made without departing from the spirit of my invention; but

What I claim is—

1. A panic-guard for theaters, halls and other public structures, comprising a movable partition located adjacent the floor for dividing the floor-space into separate sections, in combination with operatively-associated power-controlled mechanism for operating said partition.

2. A panic-guard for theaters, halls, and other public structures, comprising a movable partition located adjacent the floor for dividing the floor-space into separate sections, in combination with means located below the floor for operating said partition.

3. A panic-guard for theaters, halls and other public structures, comprising a plurality of movable partitions located adjacent the floor and arranged out of alinement with each other for dividing the floor-space into separate sections, in combination with operatively-associated power-controlled mechanism for operating said partitions.

4. A panic-guard for theaters, halls and other public structures, comprising a plurality of movable partitions for dividing the floor-space into separate sections, in combination with means for operating said partitions from a central station.

5. A panic-guard for theaters, halls and other public structures, comprising a plurality of movable partitions for dividing the floor-space into separate sections, in combination with means for simultaneously operating said partitions.

6. A panic-guard for theaters, halls and other public structures, comprising a movable partition extending below the floor of said structure, in combination with means for elevating said partition for dividing the floor-space into separate sections.

7. A panic-guard for theaters, halls and other public structures, comprising a plurality of movable partitions extending below the floor of said structure, in combination with means for elevating said partitions for dividing the floor-space into separate sections.

8. A panic-guard for theaters, halls and other public structures, comprising a plurality of movable partitions extending below the floor of said structure, in combination with means for elevating said partitions simultaneously for dividing the floor-space of said structure into separate sections.

9. A panic-guard for theaters, halls and other public structures, comprising a movable partition normally extending above the floor of said structure and dividing the floor-space into separate sections, in combination with means for further elevating same when desired.

10. A panic-guard for theaters, halls and other public structures, comprising a plurality of movable partitions normally extending above the floor of said structure and dividing the floor-space into separate sections, in combination with means for further elevating same when desired.

11. A panic-guard for theaters, halls and other public structures, comprising a plurality of movable partitions normally extending above the floor of said structure and dividing the floor-space into separate sections, in combination with means for further elevating said partitions, simultaneously when desired.

12. A panic-guard for theaters, halls and other public structures, comprising a plurality of movable partitions normally extending above the floor of said structure and dividing the floor-space into separate sections, in combination with means for further elevating said partitions from a central station.

13. A panic-guard for theaters, halls and other public structures, comprising a movable partition located adjacent the floor and extending at substantially right angles to the tiers of seats for dividing the floor-space into separate sections, in combination with operatively-associated power-controlled mechanism for operating said partition.

14. A panic-guard for theaters, halls, and other public structures, comprising movable partitions located adjacent the floor and extending at substantially right angles to the tiers of seats for dividing the floor-space into separate sections, in combination with means located below the floor for operating said partitions.

15. A panic-guard for theaters, halls and other public structures, comprising a longitudinally-disposed movable partition extending below the floor of said structure, in combination with means for elevating said partition for dividing the floor-space into separate sections.

16. A panic-guard for theaters, halls and other public structures, comprising a longitudinally-disposed partition normally extending above the floor of said structure and dividing the floor-space into separate sections in combination with means for further elevating said partition when desired.

17. A panic-guard for theaters, halls and other public structures, comprising longitudinally and transversely disposed movable partitions arranged adjacent the aisles and tiers of seats for dividing the floor-space of said structure into separate sections, in combination with operatively-associated power-controlled mechanism for operating said partitions.

18. A panic-guard for theaters, halls and other public structures, comprising longitudinally and transversely disposed movable partitions extending below the floor of said structure, in combination with means for elevating said partitions for dividing the floor-space into separate sections.

19. A panic-guard for theaters, halls and other public structures, comprising longitudinally and transversely disposed movable partitions normally extending above the floor of said structure for dividing the floor-space into separate sections, in combination with means for further elevating said partitions when desired.

20. In a panic-guard for theaters, halls and other public structures, the combination with a stationary partition for dividing the floor-space of said structure into separate sections, of a movable partition adjacent said stationary partition, and means for elevating said movable partition.

21. In a panic-guard for theaters, halls and other public structures, the combination with a plurality of stationary partitions for dividing the floor-space of said structure into separate sections, of a plurality of movable partitions adjacent said stationary partitions and means for elevating said movable partitions.

22. In a panic-guard for theaters, halls and other public structures, the combination with a plurality of stationary partitions for dividing the floor-space of said structure into separate sections, of a plurality of movable partitions adjacent said stationary partitions and means for elevating said movable partitions from a central station.

23. In a panic-guard for theaters, halls and other public structures, the combination with a plurality of stationary partitions for dividing the floor-space of said structure into separate sections, of a plurality of movable partitions adjacent said stationary partitions and means for simultaneously elevating said movable partitions.

23. In a panic-guard for theaters, halls and other public structures, the combination with a stationary partition for dividing the floor-space of said structure into separate sections, a movable partition coöperating therewith for increasing the height of said stationary partition, and means for operating said movable partition.

25. In a panic-guard for theaters, halls and other public structures, the combination with a stationary partition for dividing the floor-space of said structure into separate sections, a movable partition adjacent to said stationary partition, the tops of said partitions normally lying substantially flush, and means for elevating said movable partition above said stationary partition for forming a continuous partition of greater height.

26. In a panic-guard for theaters, halls and other public structures, the combination with a spaced stationary partition, of a movable partition disposed within said spaced partition, and means for elevating said movable partition.

27. A panic-guard for theaters, halls and other public structures, comprising a movable partition formed from a sheet of suitable non-flexible material, located adjacent the floor in combination with operatively-associated power-controlled mechanism for elevating said partition for dividing the floor-space of said structure into separate sections.

28. A panic-guard for theaters, halls and other public structures, comprising a movable partition located adjacent the floor formed from a sheet of metal in combination with operatively-associated power-controlled mechanism for elevating said partition for dividing the floor-space of said structure into separate sections.

29. A panic-guard for theaters, halls, and other public structures, comprising a plurality of movable partitions formed from suitable non-flexible material, located adjacent the floor, in combination with means located below the floor for elevating said partitions and dividing the floor-space of said structure into separate sections.

30. A panic-guard for theaters, halls, and other public structures, comprising a plurality of movable partitions located adjacent the floor, each partition formed from a sheet of suitable metal, in combination with means located below the floor for elevating said partitions and dividing the floor-space of said structure into separate sections.

31. In a panic-guard for theaters, halls and other public structures, the combination with a spaced stationary partition extending above the floor of said structure for dividing the floor-space into separate sections, of a movable partition disposed within said spaced partition, a flanged rail on top of said movable partition normally resting on the top of the side walls of said spaced stationary partition, and means for elevating said movable partition.

32. In a panic-guard for theaters, halls and other public structures, the combination with a stationary spaced metallic partition extending above the floor of said structure for dividing the floor-space into separate sections, of a movable metallic partition disposed within said spaced partition and provided on its top edge with a flanged rail normally resting on the top of the side walls of said spaced partition, and means for elevating said movable partitions above said stationary partition.

In testimony whereof I affix my signature in the presence of two witnesses.

JOSEPH P. PAGE.

Witnesses:
 CYRUS GATES,
 A. J. CRAVEN.